Dec. 15, 1959 A. L. NILSSON 2,917,304
SPRING SUSPENSION FOR VEHICLES
Filed Sept. 14, 1955 2 Sheets-Sheet 1

INVENTOR
August Leander Nilsson
BY Peirce, Scheffler & Parker
ATTORNEYS

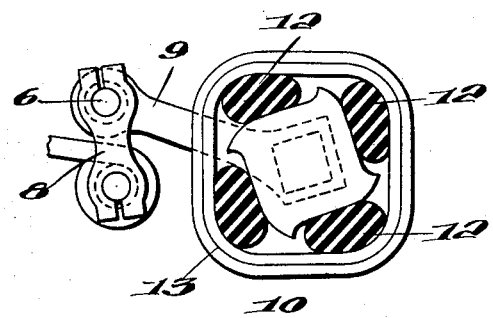
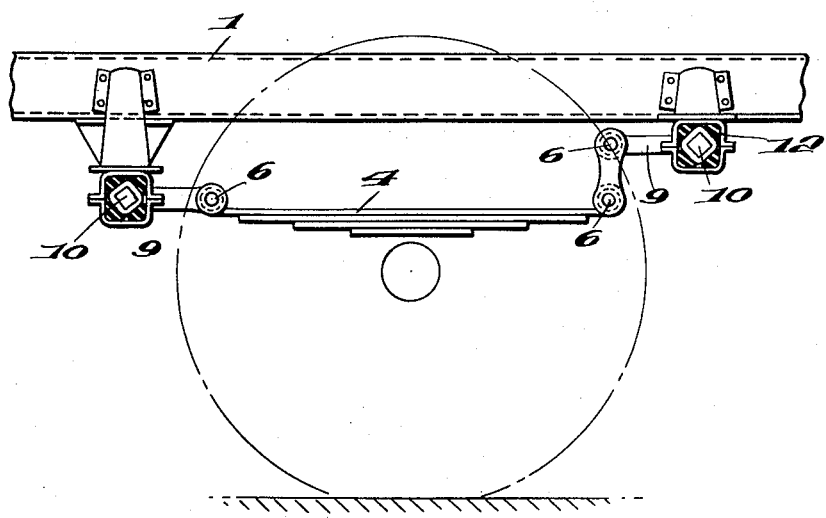

United States Patent Office 2,917,304
Patented Dec. 15, 1959

2,917,304

SPRING SUSPENSION FOR VEHICLES

August Leander Nilsson, Södertälje, Sweden

Application September 14, 1955, Serial No. 534,306

Claims priority, application Sweden September 14, 1954

1 Claim. (Cl. 267—11)

The present invention refers to spring suspensions for vehicles, wherein the wheel of the vehicle is secured to a leaf spring or beam pivotally connected at one end thereof to the frame of the vehicle, said leaf spring or beam being at the other end thereof pivotally connected by means of a link to the arm of a torsion means secured in the vehicle frame. To provide for so-called progressive resiliency in a construction of this type, the link may be arranged in such manner relative to the arm carried by the torsion means that the effective lever length is reduced at an increasing torsion.

The present invention has for its object in a spring suspension of the kind described above to provide for progressive resiliency in a simple manner simultaneously with damping of oscillations, and the arrangement according to the invention is principally distinguished by the feature that the torsion means is constituted by a rod mounted between a plurality of rubber members. Such torsion suspensions are known per se. In addition to said advantage of also providing for damping in a simple manner, the arrangement according to the invention also involves the attainment of a stabilizator by simple means.

Figure 1:
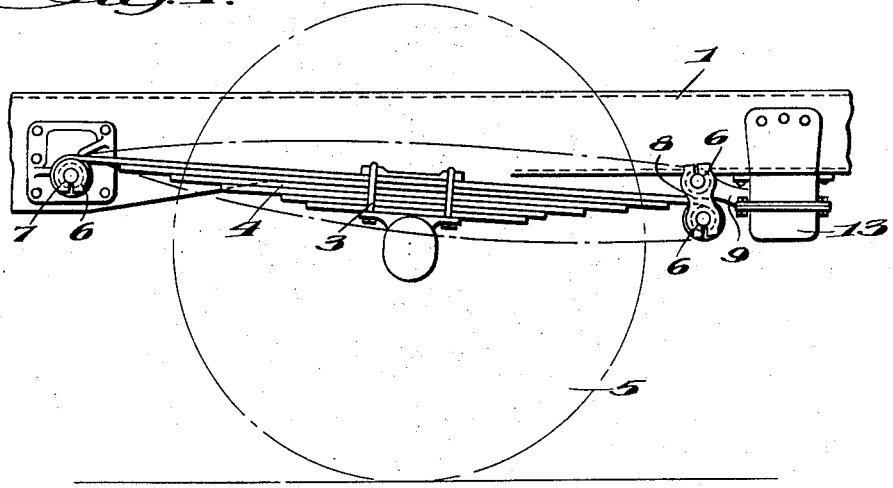
Figure 2:
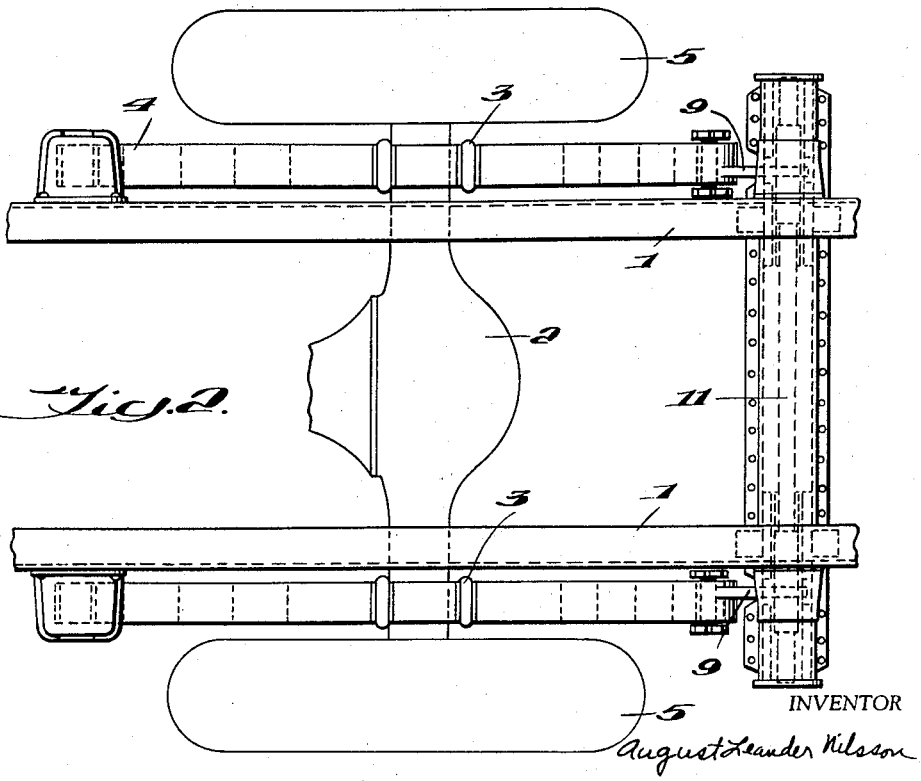

The invention will be explained in the following with reference to the accompanying drawing, which illustrates a form of embodiment of the same. In the drawing, Fig. 1 represents an elevation of the driving pair of wheels of a motor vehicle, while Fig. 2 shows the same pair of wheels viewed from above. Fig. 3 shows a detail of Fig. 1 on a larger scale. Fig. 4 shows a modified embodiment of the invention.

In the figures, 1 designates the frame side members of an automobile. The rear axle casing containing the differential is denoted by 2, said casing being secured by means of U-bolts 3 to leaf spring 4. The driving wheels are designated by 5.

Each leaf spring 4 is pivotally connected at one end thereof to the adjacent frame side member 1 by means of a rubber metal element 6 of the "silent bloc" type forming a bearing for the leaf spring, when the latter swings about the pin 7 secured to the member 1. The leaf spring is at the opposite end thereof pivotally connected by means of a similar rubber-metal element 6 to one end of a link 8, the other end of which is pivotally connected by means of a further rubber-metal element 6 to the free end of an arm 9 supported by a rod-end 10 of a generally square section. As will be apparent from the drawings the length of the crank arm 9 is at least one-eighth of the length of the leaf springs.

The rod-end 10 is formed at one end of a rock-shaft rod 11 extending transversely across the vehicle, so that the two rod-ends 10 will be in a moment-transmitting connection with one another. The rod-ends 10 are mounted between four rubber elements 12 inserted into a sleeve or casing 13 of a substantially square section. It will appear from Fig. 2 that the arm 9 is arranged substantially midway of the bar 10 and that a set of four rubber elements 12 is arranged on each side of the arm 9.

The torsion suspension with the rod-end 10 and the rubber elements 12 as described is known per se and possesses the property that the spring characteristic is curved in a manner such that the resiliency becomes progressive. Furthermore, damping is obtained by reason of internal friction in the rubber elements. The rod-end 10 is understood not to take up torsional stresses alone but stresses of flexure as well, for which reason the arrangement shown with rubber beddings on both sides of the arm 9 is very advantageous.

If only the wheel on one side of the vehicle is considered, it will be found that the vertical movements thereof will be composed, first, of a deflection of the leaf spring 4, and, second, of a turning movement of the rod-end 10 at a deformation of the rubber elements 12. In dependence on the requirements laid down, the stiffness of the leaf spring 4 may be varied relatively to the stiffness of the spring means 10, 12, so that a greater or smaller portion of the total movement will be absorbed by the leaf spring. In certain cases the latter may be simply replaced by a stiff beam, so that the total movement will be absorbed by the spring means 10, 12.

To counteract swaying of the vehicle it is known to transmit a portion of the vertical movement of the one wheel to the other. In the arrangement according to the invention, the turning movement of one rod-end 10 is transmitted to the other rod-end, whereby the desired stabilizing effect is attained in a simple manner. It should be observed here that the turning movement of the rod-end 10 does not correspond to the total movement of the appertaining wheel, when the wheel is carried by a leaf spring 4. Here, the adjustment between the leaf spring 4 and the spring means 10, 12 may be such that the turning movement of the rod-end 10 causes a desired alteration of the conditions of resiliency for the wheels, whereas the rod 11 may be entirely rigid. In certain cases it may be found suitable to make the rod as a torsion spring.

By the fact that a considerable portion of the movement of the wheel 5 may be absorbed by the spring means 10, 12, it will be possible to replace the hitherto commonly employed heavy leaf springs by a beam formed in a suitable manner, said beam being rigid or resilient to some extent, or by a few relatively powerful spring leaves. Hereby a considerable saving of weight will be obtained in the movable, non-suspended system, which has a favourable effect on the conditions of resiliency.

Owing to the rubber metal bushings 6 provided at the points of articulation and by reason of the rubber bedding of the rod-end 10, a very effective damping of any occurring vibrations will be obtained, such vibrations being to a considerable extent prevented from being transmitted to the frame of the vehicle.

According to Fig. 4 the leaf spring 4 is at both ends connected to the frame by means of rod-ends 10 carried by rubber elements. The joints between the ends of the arms 9 and the spring ends consist of rubber bushings 6 of the "silent bloc" type. Also in this embodiment the rod-ends 10 on each side of the vehicle may be interconnected to form a stabilizing means.

The invention is not limited to the embodiments above described and shown in the drawing, but may be modified in its details within the scope of the appended claim.

What I claim is:

A spring suspension for a vehicle frame comprising a leaf spring at each side of the frame, each of said leaf springs being pivotally connected at one end to said frame, a wheel axle extending transversely across said frame and being connected to each of the leaf springs intermediate their ends, and progressively operating torsion means connecting the other ends of said leaf springs to the vehicle frame comprising a rock shaft extending transversely across the vehicle frame, crank arms on said shaft connected to the other ends of said leaf springs, the length of each of said crank arms being at least one eighth of the length of the leaf springs, said rock shaft having non-cylindrical end portions adjacent said crank arms, and bearing means secured to said frame and supporting the non-cylindrical ends of said rock shaft, each of said bearing means including a rigid sleeve secured to said frame, and a plurality of resilient elements peripherally arranged about said rock shaft non-cylindrical end portion intermediate said end portion and said sleeve.

References Cited in the file of this patent

UNITED STATES PATENTS

| | | |
|---|---|---|
| 1,199,123 | Smoot | Sept. 26, 1916 |
| 1,945,595 | Chilton | Feb. 6, 1934 |
| 2,068,676 | Hickman | Jan. 26, 1937 |
| 2,198,616 | Hickman | Apr. 20, 1940 |
| 2,254,325 | Slack et al. | Sept. 2, 1941 |
| 2,712,742 | Neidhart | July 12, 1955 |

FOREIGN PATENTS

| | | |
|---|---|---|
| 772,052 | France | Aug. 6, 1934 |
| 641,952 | Great Britain | Aug. 23, 1950 |
| 1,019,504 | France | Oct. 29, 1952 |
| 1,064,177 | France | Dec. 23, 1953 |